(12) United States Patent
Kunishima

(10) Patent No.: US 9,956,987 B2
(45) Date of Patent: May 1, 2018

(54) MANUFACTURING METHOD OF BAR COMPONENT AND BAR COMPONENT

(71) Applicant: JTEKT CORPORATION, Osaka-shi, Osaka (JP)

(72) Inventor: Takeshi Kunishima, Shiki-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 621 days.

(21) Appl. No.: 14/539,283

(22) Filed: Nov. 12, 2014

(65) Prior Publication Data
US 2015/0147504 A1    May 28, 2015

(30) Foreign Application Priority Data

Nov. 22, 2013 (JP) .................................. 2013-242097
Dec. 9, 2013 (JP) .................................. 2013-254397

(51) Int. Cl.
| | | |
|---|---|---|
| *B62D 3/12* | (2006.01) | |
| *B29C 70/32* | (2006.01) | |
| *B29C 70/86* | (2006.01) | |
| *B29C 37/00* | (2006.01) | |
| *F16C 3/02* | (2006.01) | |
| *B32B 37/14* | (2006.01) | |
| *B32B 37/16* | (2006.01) | |
| *B32B 38/00* | (2006.01) | |
| *B29L 31/24* | (2006.01) | |
| *B29L 31/00* | (2006.01) | |
| *B29L 23/00* | (2006.01) | |

(52) U.S. Cl.
CPC .......... *B62D 3/126* (2013.01); *B29C 37/0082* (2013.01); *B29C 70/32* (2013.01); *B29C 70/86* (2013.01); *B32B 37/142* (2013.01); *B32B 37/16* (2013.01); *B32B 38/00* (2013.01); *F16C 3/026* (2013.01); *B29L 2023/22* (2013.01); *B29L 2031/24* (2013.01); *B29L 2031/75* (2013.01); *B29L 2031/7752* (2013.01); *B32B 2038/0052* (2013.01); *F16C 2226/60* (2013.01); *F16C 2326/24* (2013.01); *Y10T 428/1355* (2015.01)

(58) Field of Classification Search
CPC ......... B62D 3/126; B29C 70/32; B29C 70/86; B32B 37/142; B32B 37/16; B32B 38/00; F16C 3/026
USPC ...................................................... 428/35.8
See application file for complete search history.

(56) References Cited

U.S. PATENT DOCUMENTS

| | | | |
|---|---|---|---|
| 2,837,456 | A | 6/1958 | Parilia |
| 4,238,539 | A | 12/1980 | Yates et al. |
| 4,380,443 | A | 4/1983 | Federmann et al. |
| 4,569,710 | A | 2/1986 | Lambot et al. |
| 5,415,079 | A | 5/1995 | Ching |
| 5,601,493 | A | 2/1997 | Nakazono et al. |
| 2010/0260955 | A1 | 10/2010 | Hasegawa et al. |

FOREIGN PATENT DOCUMENTS

| | | |
|---|---|---|
| JP | S5871119 A | 4/1983 |
| JP | S6382728 A | 4/1988 |
| JP | S6426430 A | 1/1989 |
| JP | H01-101140 A | 4/1989 |
| JP | H02-78533 A | 3/1990 |
| JP | H04-197740 A | 7/1992 |
| JP | A-05-193097 | 8/1993 |
| JP | H06-200951 A | 7/1994 |
| JP | A-07-091433 | 4/1995 |
| JP | H07-506893 A | 7/1995 |
| JP | 2001-032819 A | 2/2001 |
| JP | 2004263378 A | 9/2004 |
| JP | 2010-260344 A | 11/2010 |
| JP | 2011-098475 A | 5/2011 |
| JP | A-2012-153314 | 8/2012 |
| JP | A-2013-075533 | 4/2013 |
| JP | 2013-103652 A | 5/2013 |
| WO | 2006/066309 A1 | 6/2006 |

OTHER PUBLICATIONS

Apr. 1, 2015 Extended Search Report for European Patent Application No. 14193737.5.
Oct. 26, 2017 Office Action issued in Japanese Application No. 2013-254397.
May 29, 2017 Office Action issued in Japanese Patent Application No. 2013-242097.
Jul. 27, 2017 Office Action Issued in Japanese Patent Application No. 2013-242097.

*Primary Examiner* — Edward J Cain
(74) *Attorney, Agent, or Firm* — Oliff PLC

(57) ABSTRACT

A manufacturing method of a bar component including a pipe made of a carbon fiber reinforced resin and an internal metal member having an outer peripheral surface in contact with an inner peripheral surface of an end portion of the pipe in an axial direction is provided. The method includes: preparing a core including a metal mandrel extending in the axial direction and the internal metal member having the outer peripheral surface subjected to surface roughening process; winding a prepreg sheet obtained by impregnating carbon fibers with resin around an outer peripheral surface of the core; forming the pipe having the end portion fitted onto and fixed to the outer peripheral surface of the internal metal member by baking and curing the prepreg sheet wound around the outer peripheral surface of the core; and removing the mandrel from the pipe.

13 Claims, 10 Drawing Sheets

F I G . 14
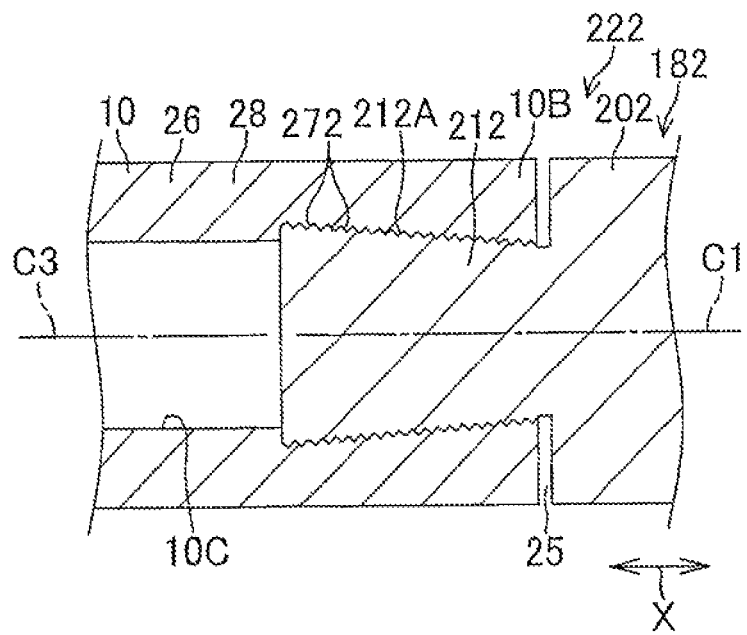
F I G . 15
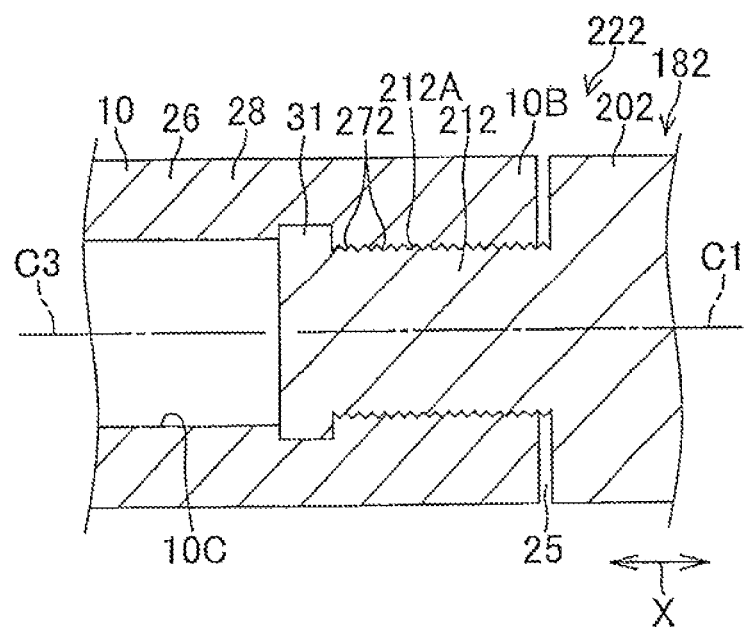

MANUFACTURING METHOD OF BAR COMPONENT AND BAR COMPONENT

INCORPORATION BY REFERENCE

The disclosure of Japanese Patent Applications No. 2013-242097 filed on Nov. 22, 2013 and No. 2013-254397 filed on Dec. 9, 2013 each including the specification, drawings and abstract is incorporated herein by reference in its entirety.

BACKGROUND OF THE INVENTION

1. Field of the Invention

The invention relates to a manufacturing method of a bar component and the bar component.

2. Description of Related Art

A propeller shaft described in Japanese Patent Application Publication No. 7-91433 (JP 7-91433 A) is manufactured by attaching a metal thin ring having an outer diameter substantially equal to an inner diameter of a main body tube made of a fiber reinforced plastic (FRP), into an end portion of the main body tube and press-fitting a metal joint having an outer diameter larger than an inner diameter of the thin ring into the thin ring. When the metal joint is press-fitted, hard particles disposed on the outer peripheral surface of the thin ring bite into the inner surface of the main body tube made of the FRP.

In addition, examples of application of the FRP include, as described in Japanese Patent Application Publication No. 5-193097 (JP 5-193097 A), a roll main body of a gravure print roll in which a cylindrical body made of a fiber reinforced resin is fitted into a metal cylindrical body via an adhesive layer and, as described in Japanese Patent Application Publication No. 2012-153314 (JP 2012-153314 A), a rack obtained by winding a prepreg around a core metal so as to form layers and thereby forming a shell made of a carbon FRP.

In the propeller shaft described in JP 7-91433 A, since the outer peripheral surface of the thin ring bites into the inner surface of the main body tube made of the FRP by press-fitting the joint into the thin ring, fibers constituting the FRP may be cut.

SUMMARY OF THE INVENTION

The Invention provides a manufacturing method of a bar component capable of preventing a carbon fiber from being cut when a metal member is fixed to the internal portion of a pipe made of a carbon fiber reinforced resin, and the bar component.

A first aspect of the invention relates to a manufacturing method of a bar component including a pipe made of a carbon fiber reinforced resin and an internal metal member having an outer peripheral surface in contact with an inner peripheral surface of an end portion of the pipe in an axial direction. The method includes: preparing a core including a metal mandrel extending in the axial direction and the internal metal member having the outer peripheral surface subjected to surface roughening process; winding a prepreg sheet obtained by impregnating carbon fibers with resin around an outer peripheral surface of the core; forming the pipe having the end portion fitted onto and fixed to the outer peripheral surface of the internal metal member by baking and curing the prepreg sheet wound around the outer peripheral surface of the core; and removing the mandrel from the pipe.

According to the above configuration, after the baking and the curing, only the mandrel of the core is removed from the pipe, and the internal metal member is fitted into the end portion of the pipe. In this state, resin having exuded from the prepreg sheet enters into a concave portion of the outer peripheral surface of the internal metal member subjected to surface roughening process (process to make a surface uneven). With this, the end portion of the pipe is in intimate contact with the outer peripheral surface of the internal metal member and is fixed to the outer peripheral surface thereof more firmly in a state in which the carbon fiber is not cut. As a result of the foregoing, it is possible to prevent the carbon fiber in the pipe from being cut when the internal metal member is fixed to the internal portion of the pipe made of the carbon fiber reinforced resin.

A second aspect of the invention relates to the manufacturing method of a bar component according to the first aspect. In the second aspect, the internal metal member may be a metal annular ring, and the core may be prepared by fitting the metal annular ring onto the mandrel.

According to the above configuration, after the baking and the curing, only the mandrel of the core is pulled out from the pipe, and the metal annular ring is fitted into the end portion of the pipe. In this state, resin having exuded from the prepreg sheet enters into a concave portion of the outer peripheral surface of the metal annular ring subjected to surface roughening process (process to make a surface uneven). With this, the end portion of the pipe is in intimate contact with the outer peripheral surface of the metal annular ring and is fixed to the outer peripheral surface thereof more firmly in a state in which the carbon fiber is not cut.

The manufacturing method may further include screw-fastening a metal component to an inner peripheral surface of the metal annular ring to fasten the metal component to the end portion of the pipe. In addition, the manufacturing method may further include forming, in the inner peripheral surface of the metal annular ring, a female threaded portion to be screw-fastened to a male threaded portion provided in the metal component.

In addition, the metal component and the metal annular ring are screw-fastened to each other, and hence, unlike the case where the metal component is press-fitted into the metal annular ring, it is possible to fasten the end portion of the pipe and the metal component to each other more reliably and firmly without applying extra force to the metal annular ring. As a result, the outer peripheral surface of the metal annular ring does not bite into the pipe, and the carbon fiber in the pipe is not cut.

As a result of the foregoing, it is possible to prevent the carbon fiber in the pipe from being cut and achieve an improvement in the strength in a coupling portion between the pipe and the metal component.

The prepreg sheet may be wound around the outer peripheral surface of the core with a heat-adhesive film interposed between the prepreg sheet and an outer peripheral surface of the metal annular ring.

According to the above configuration, in the case where the heat-adhesive film is interposed between the prepreg sheet and the outer peripheral surface of the metal annular ring, the outer peripheral surface of the metal annular ring and the pipe are bonded to each other not only with the resin of the prepreg sheet but also with the heat-adhesive film, and hence it is possible to fix the metal annular ring to the pipe more firmly. According to the above configuration, it is possible to prevent the carbon fiber in the pipe from being cut and achieve an improvement in the strength in the coupling portion between the pipe and the metal component.

A third aspect of the invention relates to the manufacturing method of a bar component according to the first aspect. In the third aspect, the bar component includes the pipe, and a metal component having a main body portion and an extended portion smaller in diameter than the main body portion, the main body portion and the extended portion being arranged in the axial direction of the pipe; the internal metal member is the extended portion; and the core is prepared by connecting the mandrel and the extended portion to each other in the axial direction.

By baking and curing the prepreg sheet, resin having exuded from the prepreg sheet enters into the concave portion of the outer surface of the extended portion subjected to the surface toughening process (process to make surface uneven). With this, the pipe is in intimate contact with the extended portion and is fixed to the extended portion firmly. Thus, in the bar component, the pipe and the metal component are directly coupled to each other without interposing another component between the pipe and the metal component. As a result, it is possible to maintain a state in which the pipe and the metal component are coaxially disposed, and improve positioning accuracy of the pipe and the metal component. In addition, it is possible to omit the other component and it becomes unnecessary to take countermeasures required to prevent the carbon fiber from being cut in the case where the other component is provided, and hence it is possible to reduce the manufacturing cost of the entire bar component. As a result of the foregoing, it is possible to achieve a reduction in manufacturing cost while improving the positioning accuracy of the pipe and the metal component.

The extended portion may have a tapered shape in which a diameter is increased with distance from the main body portion in the axial direction.

According to the above configuration, in the case where the outer peripheral surface of the extended portion has the tapered shape, the pipe becomes less likely to be pulled out from the extended portion so that the pipe and the metal component become less likely to be separated from each other, and hence it is possible to achieve an improvement in the strength of the bar component.

The extended portion may include a protruded portion that is protruded from an outer peripheral surface of the extended portion, and positions the pipe in the axial direction.

According to the above configuration, in the case where the protruded portion of the outer peripheral surface of the extended portion positions the pipe in the axial direction, the pipe becomes less likely to be pulled out from the extended portion so that the pipe and the metal component become less likely to be separated from each other, and hence it is possible to achieve an improvement in the strength of the bar component.

The prepreg sheet may be wound around the outer peripheral surface of the core with a heat-adhesive film interposed between the prepreg sheet and the outer peripheral surface of the extended portion.

According to the above configuration, in the case where the heat-adhesive film is interposed between the prepreg sheet and the outer peripheral surface of the extended portion, the outer peripheral surface of the extended portion and the pipe are bonded to each other not only with the resin of the prepreg sheet but also with the heat-adhesive film, and hence it is possible to fix the extended portion to the pipe more firmly.

A fourth aspect of the invention is a bar component manufactured by the manufacturing method according to the first aspect.

According to the configuration, it is possible to prevent the carbon fiber in the pipe from being cut when the internal metal member is fixed to the internal portion of the pipe made of the carbon fiber reinforced resin.

A fifth aspect of the invention is a bar component manufactured by the manufacturing method according to the second aspect.

According to the configuration, it is possible to prevent the carbon fiber in the pipe from being cut when the metal annular ring is fixed to the pipe.

A part of the metal annular ring may be protruded from the pipe to an outside in the axial direction.

According to the above configuration, a part of the metal annular ring is protruded from the pipe to the outside in the axial direction. As a result, when the pipe is bent with respect to the metal component, the metal component comes into contact with not the pipe but the metal annular ring, and hence it is possible to prevent the end portion of the pipe from coming into contact with the metal component. With this, it is possible to prevent damage to the pipe resulting from the contact with the metal component.

The bar component may constitute a rack bar included in a rack and pinion type steering device.

A sixth aspect of the invention is a bar component manufactured by the manufacturing method according to the third aspect.

According to the above configuration, it is possible to achieve a reduction in manufacturing cost while improving the positioning accuracy of the pipe and the metal component.

The bar component may constitute a rack bar included in a rack and pinion type steering device.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 14 is a cross-sectional view of a portion where a second metal component 182 and a pipe 10 of a third modification are coupled to each other, and FIG. 15 is a view in which in which a fourth modification is applied to a bar component 222 shown in FIG. 14.

DETAILED DESCRIPTION OF EMBODIMENTS

Figure 1:
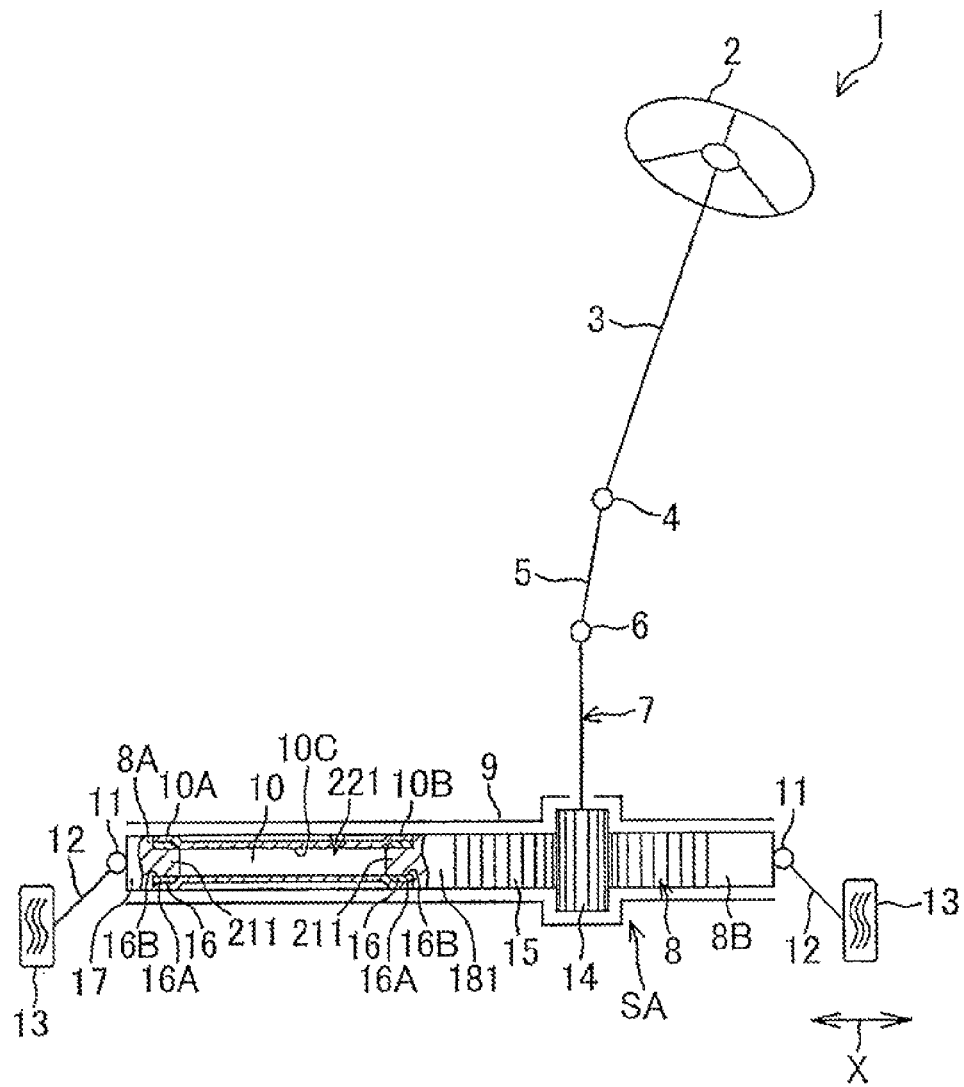
FIG. 1 is a schematic front view of a steering device 1 including a bar component 221 in a first embodiment of the invention.

Hereinbelow, a first embodiment of the invention will be described in detail with reference to the accompanying drawings. FIG. 1 is a schematic front view of a steering device 1 including a bar component 221 in the present embodiment. As shown in FIG. 1, the steering device 1 includes a steering member 2, a steering shaft 3, a first universal joint 4, an intermediate shaft 5, a second universal joint 6, a pinion bar 7, a rack bar 8, and a housing 9.

As the steering member 2, it is possible to use, e.g., a steering wheel. One end of the steering shaft 3 is coupled to the steering member 2. The other end of the steering shaft 3 and one end of the intermediate shaft 5 are coupled to each other with the first universal joint 4. In addition, the other end of the intermediate shaft 5 and one end of the pinion bar 7 are coupled to each other with the second universal joint 6. The steering shaft 3, the intermediate shaft 5, and the pinion bar 7 may not be arranged on the same straight line.

Pinion teeth 14 are integrally provided on the outer peripheral surface of the other end of the pinion bar 7. The rack bar 8 has a substantially cylindrical shape that extends in the width direction of a vehicle (left-right direction in FIG. 1). Herein, the direction in which the rack bar 8 extends is assumed to be an axial direction X. The axial direction X is coincident with the width direction of the vehicle (the left-right direction in FIG. 1). In addition, the front side of a paper sheet corresponds to the front side of the vehicle, and the back side of the paper sheet corresponds to the rear side of the vehicle. At one position on the circumference of the outer peripheral surface of the rack bar 8, rack teeth 15 that are engaged with the pinion teeth 14 are formed. The pinion teeth 14 of the pinion bar 7 and the rack teeth 15 of the rack bar 8 are engaged with each other to constitute a rack and pinion type steering mechanism SA.

The rack bar 8 is accommodated in the housing 9. The housing 9 is a substantially cylindrical body that is fixed to a vehicle body. The rack bar 8 is disposed coaxially with the housing 9. Both end portions of the rack bar 8 protrude to both sides of the housing 9, and a tie rod 12 is coupled to each end portion of the rack bar 8 via a joint 11. The tie rod 12 is coupled to a corresponding steered wheel 13 via a corresponding steering knuckle arm (not shown).

When the steering member 2 is operated and the steering shaft 3 is rotated, the rotation is converted to a linear motion of the rack bar 8 along the axial direction X by the pinion teeth 14 and the rack teeth 15. With this, the steering of the steered wheel 13 is achieved. Thus, the rack bar 8 moves in the axial direction X in response to the steering of the steering member 2, and the steered wheel 13 can thereby be steered.

The rack bar 8 includes a first end portion (an end portion on the left side in the axial direction X in FIG. 1) 8A and a second end portion (an end portion on the right side in the axial direction X in FIG. 1) 8B. The rack bar 8 includes a pipe 10, metal annular rings 16, and a first metal component 171 and a second metal component 181 as two metal components. The rack teeth 15 are provided in the second metal component 181. The pipe 10 is made of a carbon fiber reinforced resin, and has a substantially cylindrical shape that extends in the axial direction X. The pipe 10 is provided at a position closer to the first end portion 8A than the rack teeth 15 in the rack bar 8, and is disposed between the first metal component 171 and the second metal component 181 in the axial direction X. The pipe 10 has a first end portion (an end portion on the left side in the axial direction X in FIG. 1) 10A, a second end portion (an end portion on the right side in the axial direction X in FIG. 1) 10B, and an inner peripheral surface 10C.

Each metal annular ring 16 has an annular shape that extends in the axial direction X. The metal annular ring 16 is provided in each of the first end portion 10A and the second and portion 10B of the pipe 10 (two metal annular rings 16 are provided). The metal annular ring 16 has an outer peripheral surface 16A and an inner peripheral surface 16B. The metal annular ring 16 is fitted into each of the first end portion 10A and the second end portion 10B of the pipe 10. In other words, each of the first end portion 10A and the second and portion 10B of the pipe 10 is fitted onto the outer peripheral surface 16A of the metal annular ring 16. Accordingly, in each of the first end portion 100A and the second end portion 10B, the diameter of the inner peripheral surface 10C is increased to the diameter substantially equal to the diameter of the outer peripheral surface 16A of the metal annular ring 16. The diameter of the inner peripheral surface 16B of the metal annular ring 16 is substantially equal to the diameter of the inner peripheral surface 10C of the pipe 10 in an area between the first end portion 10A and the second end portion 10B.

The first metal component 171 is adjacent to the joint 11 on the side of the first end portion 8A as the first end portion 8A of the rack bar 8. The first metal component 171 is adjacent to the first end portion 10A of the pipe 10. A small diameter portion 211 is provided at an end portion of the first metal component 171 adjacent to the first end portion 10A of the pipe 10. The small diameter portion 211 has a cylindrical shape that extends in the axial direction X toward the second end portion 8B of the rack bar 8. The diameter of the small diameter portion 211 is smaller than the diameter of the first metal component 171.

The second metal component 181 is adjacent to the joint 11 on the side of the second end portion 8B as the second end portion 8B of the rack bar 8. The second metal component 181 is formed of, e.g., a hardened carbon steel. The second metal component 181 is adjacent to the second end portion 10B of the pipe 10. The small diameter portion 211 is also provided at an end portion of the second metal component 181 adjacent to the second end portion 10B of the pipe 10. The small diameter portion 211 of the second metal component 181 has a cylindrical shape that extends in the axial direction X toward the first end portion 8A of the rack bar 8. Note that the small diameter portion 211 of the second metal component 181 may be different in dimensions (the diameter and the length in the axial direction X) from the small diameter portion 211 of the first metal component 171. Although described later in detail, each of the first metal component 171 and the second metal component 181 is fastened to the end portion (the first end portion 10A or the second end portion 10B) of the pipe 10 at the small diameter portion 211, and the pipe 10, the first metal component 171, and the second metal component 181 that are fastened to one another constitute the bar component 221 that extends in the axial direction X. The bar component 221 constitutes the rack bar 8. The pipe 10 made of the carbon fiber reinforced resin constitutes a part of the rack bar 8, and hence it is possible to achieve a significant reduction in weight as compared with the case where the entire rack bar 8 is made of metal.

Figure 2:
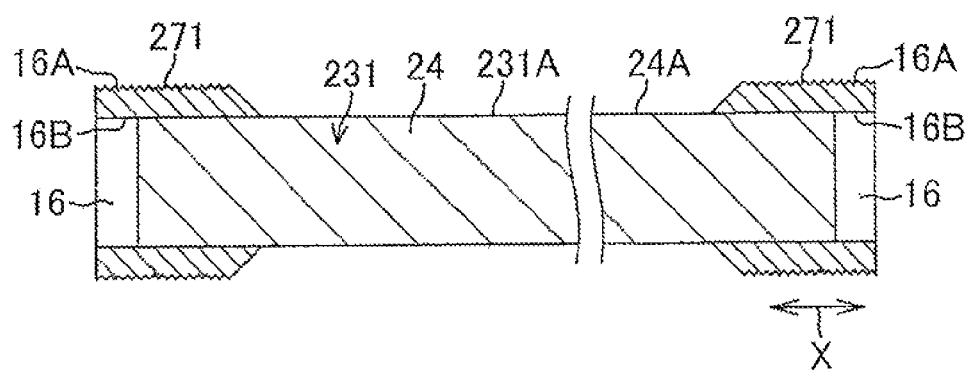
FIG. 2 is a schematic cross-sectional view showing a manufacturing step of the bar component 221.

Next, a manufacturing method of the bar component 221 will be described. FIG. 2 is a schematic cross-sectional view showing a manufacturing step of the bar component 221. The attitude of each member in FIG. 2 corresponds to that in FIG. 1 (the same applies to FIGS. 3 to 7 described later). As shown in FIG. 2, as the initial stage of manufacturing of the bar component 221, a core 231 is prepared. The core 231 is a member required to form the cylindrical pipe 10. The core 231 includes a mandrel 24 and the above-described metal annular ring 16. The mandrel 24 is made of metal and has a cylindrical shape that extends in the axial direction X. The outer peripheral surface 16A of the metal annular ring 16 is subjected to surface roughening process in advance. Accordingly, the outer peripheral surface 16A has rough portion 271 provided with a large number of concave portions and convex portions Examples of the surface roughening process include knurling such as diamond-pattern knurling, key groove machining, splining, shot blasting, etching that uses acid, and laser etching, and diamond-pattern 26 knurling is preferable in light of processing cost.

Figure 3:
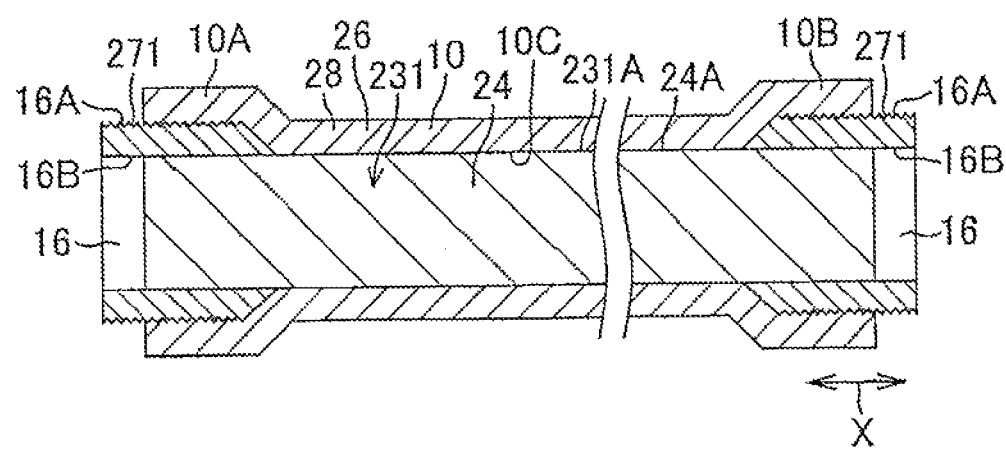
FIG. 3 is a schematic cross-sectional view showing the step subsequent to the step in FIG. 2.

In the step shown in FIG. 2, the core 231 is prepared by fitting the metal annular rings 16 onto the both end portions of the mandrel 24 on both sides in the axial direction X. An outer peripheral surface 231A of the core 231 includes the outer peripheral surface 16A of each metal annular ring 16 and a portion of an outer peripheral surface 24A of the mandrel 24 protruded from the metal annular rings 16 (a portion of the outer peripheral surface 24A of the mandrel 24 which is not covered by the metal annular rings 16 fitted onto the both end portions of the mandrel 24). FIG. 3 is a schematic cross-sectional view showing the step subsequent to the step in FIG. 2.

As shown in FIG. 3, a prepreg sheet 26 serving as the material for the above-described pipe 10 is prepared. The prepreg sheet 26 is a sheet obtained by impregnating a large number of carbon fibers (not shown) aligned in a uni-direction with resin 28. As the prepreg sheet 26, all types of carbon fibers represented by "TORAYCA" (registered trademark) T300 and "TORAYCA" (registered trademark) T700 can be used. In addition, as the resin 28, thermosetting resins such as an epoxy resin, a polyimide resin, a bismaleimide resin, and an unsaturated polyester resin can be used. Since the rack bar 8 is used in an engine room of the vehicle, the curing temperature of the resin 28 is preferably not less than 130° C.

In the step shown in FIG. 3, the prepreg sheet 26 is wound around the outer peripheral surface 231A of the core 231 once, or twice or more by, e.g., a sheet winding method. In the state after the winding, as shown in FIG. 3, the prepreg sheet 26 is placed on the mandrel 24 and each metal annular ring 16. The prepreg sheet 26 is in intimate contact with the outer peripheral surface 24A of the mandrel 24 and the outer peripheral surface 16A of the metal annular ring 16 and surrounds the core 231, and hence the entire prepreg sheet 26 has a substantially cylindrical shape. The diameter of each of both end portions of the prepreg sheet 26 in the state after the winding in the axial direction X is larger than the diameter of a portion other than the both end portions of the prepreg sheet 26 in the axial direction X by the thickness of the metal annular ring 16. On the other hand, the inner diameter of the prepreg sheet 26 in the large diameter portion is substantially equal to the outer diameter of each metal annular ring 16.

Next, the prepreg sheet 26 wound around the outer peripheral surface 231A of the core 231 is baked and cured. By baking and curing in this step, the substantially cylindrical shape of the prepreg sheet 26 when the prepreg sheet 26 is wound around the outer peripheral surface 231A of the core 231 is held as it is. Thereafter, the prepreg sheet 26 becomes the pipe 10 after cooling at room temperature. That is, the pipe 10 is formed by baking and curing the prepreg sheet 26 wound around the outer peripheral surface 231A. In this state, the pipe 10 is fitted onto (specifically fitted onto and fixed to as will be described later) the outer peripheral surfaces 16A of the metal annular rings 16 at the end portions 10A and 10B.

Note that the prepreg sheet 26 is wound around the outer peripheral surface 231A of the core 231 by mainly using a winding method in which the direction of extension of the carbon fiber matches the axial direction X (what is called helical winding). Accordingly, in the pipe 10, the internal carbon fibers are aligned in the axial direction X, and hence the strength in the axial direction X is high. Next, only the mandrel 24 of the core 231 is pulled out from the pipe 10. At this point, in order to smoothly pull out the mandrel 24, the mandrel 24 may be shrunk by cooling. In this case, force required to pull out the mandrel 24 from the pipe 10 is reduced.

In a state in which the mandrel 24 is pulled out from the pipe 10, each metal annular ring 16 is fitted into the corresponding one of the first end portion 10A and the second end portion 10B of the pipe 10. In addition, a part of each metal annular ring 16 (e.g., the end portion of about 2 mm in the axial direction X) is preferably protruded (exposed) from the first end portion 10A or the second end portion 10B of the pipe 10 to the outside in the axial direction X. For this, in the step of winding the prepreg sheet 26 around the outer peripheral surface 231A of the core 231, it is only necessary not to wind the prepreg sheet 26 around the part of each metal annular ring 16.

Figure 4:
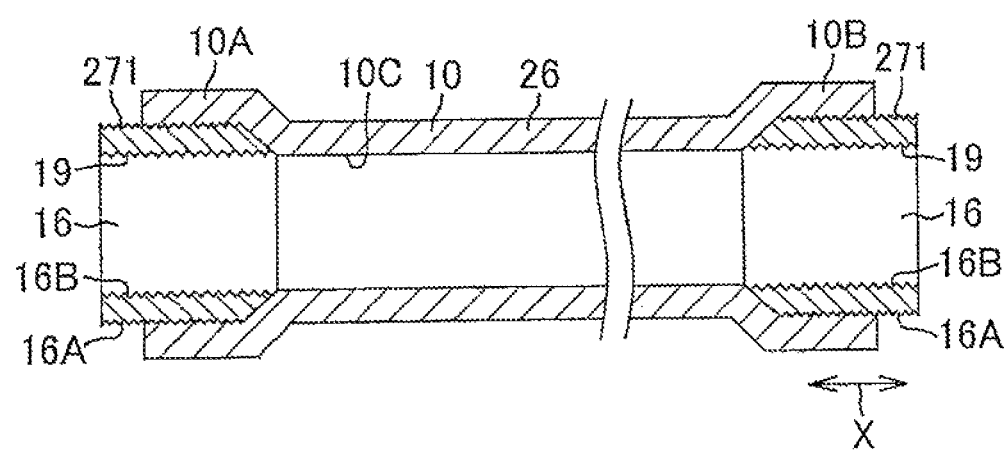
FIG. 4 is a schematic cross-sectional view showing the step subsequent to the step in FIG. 3.

FIG. 4 is a schematic cross-sectional view showing the step subsequent to the step in FIG. 3. As shown in FIG. 4, next, a female threaded portion 19 is formed in the inner peripheral surface 16B of each metal annular ring 16. The female threaded portion 19 is formed over the entire area of the inner peripheral surface 16B. Unlike the present embodiment, in the case of a comparative example in which the metal annular ring 16 is not used, the female threaded portion 19 is formed in the inner peripheral surface 10C of the pipe 10. In the case of the comparative example, when the prepreg sheet 26 is wound around the core 231 by the helical winding, the carbon fiber in the prepreg sheet 26 may be cut when the threaded portion is formed. When the carbon fiber is cut, the strength of the pipe 10 may be reduced. In order to prevent the carbon fiber from being cut in the comparative example, it is necessary to wind the prepreg sheet 26 in at least the innermost layer (a layer closest to the core 231) around the core 231 by a winding method in which the carbon fiber extends in the circumferential direction of the core 231 (what is called hoop winding).

On the other hand, in the case of the present embodiment, by using the metal annular ring 16 formed with the female threaded portion 19, the pipe 10 can be formed only by the helical winding (or with an increased rate of use of the helical winding). That is, as compared with the comparative example, since the pipe 10 can be formed by using one winding method in the present embodiment, it is possible to reduce the number of turns of the prepreg sheet 26 (around the core 231), and increase the strength in the axial direction X. That is, with the metal annular ring 16, it is possible to achieve a reduction in the cost of the pipe 10, a reduction in the weight thereof, and an improvement in the strength thereof.

Figure 5:
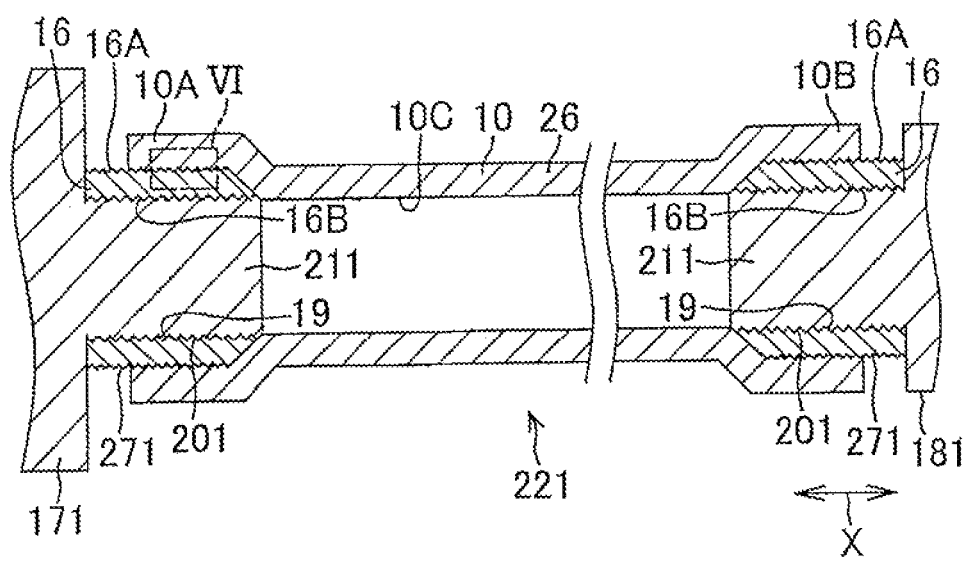
FIG. 5 is a schematic cross-sectional view showing the step subsequent to the step in FIG. 4.

FIG. 5 is a schematic cross-sectional view showing the step subsequent to the step in FIG. 4. As shown in FIG. 5, a male threaded portion 201 is provided in the outer peripheral surface of the small diameter portion 211 of the first metal component 171. To the male threaded portion 201 of the first metal component 171, the female threaded portion 19 of the metal annular ring 16 on the left side in the axial direction X in FIG. 5 (the side of the first end portion 10A of the pipe 10) is screw-fastened. With this, the first metal component 171 is screw-fastened to the inner peripheral surface 16B of the metal annular ring 16, and is fastened to the first and portion 10A of the pipe 10 via the metal annular ring 16.

On the other hand, the male threaded portion 201 is also provided in the outer peripheral surface of the small diameter portion 211 of the second metal component 181. To the male threaded portion 201 of the second metal component 181, the female threaded portion 19 of the metal annular ring 16 on the right side in the axial direction X in FIG. 5 (the side of the second end portion 10B of the pipe 10) is screw-fastened. With this, the second metal component 181 is screw-fastened to the inner peripheral surface 16B of the metal annular ring 16, and is fastened to the second end portion 10B of the pipe 10 via the metal annular ring 16.

With the foregoing, the pipe 10 is fastened to the first metal component 171 and the second metal component 181 at the both end portions 10A and 10B in the axial direction X, and the manufacturing of the bar component 221 is completed. In the completed bar component 221, as described above, a part of the metal annular ring 16 is protruded from the pipe 10 to the outside in the axial direction X. Accordingly, when the pipe 10 is bent with respect to the first metal component 171 and the second metal component 181, the first metal component 171 and the second metal component 181 come into contact with not the pipe 10 but the metal annular rings 16, and hence it is possible to prevent the end portions 10A and 10B of the pipe 10 from coming into contact with the first metal component 171 and the second metal component 181. With this, it is possible to prevent damage to the pipe 10 resulting from the contact with the first metal component 171 and the second metal component 181.

Figure 6:
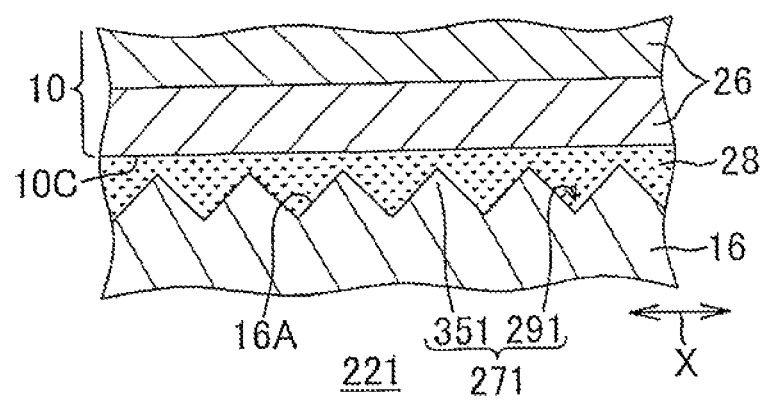
FIG. 6 is an enlarged view of a portion indicated by VI in FIG. 5.

FIG. 6 is an enlarged view of a portion indicated by VI in FIG. 5. As shown in FIG. 6, in the completed bar component 221, the resin 28 having exuded from the prepreg sheet 26 is present between the inner peripheral surface 10C of the pipe 10 and the outer peripheral surface 16A of the metal annular ring 16. The resin 28 enters into each concave portion 291 in the rough portion 271 formed on the outer peripheral surface 16A and is cured in the step of winding the prepreg sheet 26 around the core 231 and the subsequent step of baking and curing (see FIG. 3). In a state in which the resin 28 enters into the concave portion 291 and is cured, a convex portion 351 of the rough portion 271 is in intimate contact with the inner peripheral surface 10C of the pipe 10 so as to bite into the inner peripheral surface 10C, but is not in contact with the carbon fiber in the prepreg sheet 26. Therefore, the end portions 10A and 10B of the pipe 10 are fitted onto and fixed to (attached to) the outer peripheral surfaces 16A of the corresponding metal annular rings 16 in a state in which the internal carbon fibers are not cut. Note that the metal annular rings 16 in this state are positioned so as not to be displaced in the axial direction X or the circumferential direction relative to the end portions 10A and 10B of the pipe 10.

In addition, since the first metal component 171 and the second metal component 181 are screw-fastened to the metal annular rings 16, unlike the case where the first metal component 171 and the second metal component 181 are press-fitted into the metal annular rings 16, it is possible to fasten the pipe 10 (strictly speaking, the end portions 10A and 10B) to the first metal component 171 and the second metal component 181 more reliably and firmly without applying extra force to the metal annular rings 16. That is, unlike the case of press-fitting, the outer peripheral surface 16A of the metal annular ring 16 does not bite into the pipe 10, and the carbon fiber in the pipe 10 is not cut.

Figure 7:
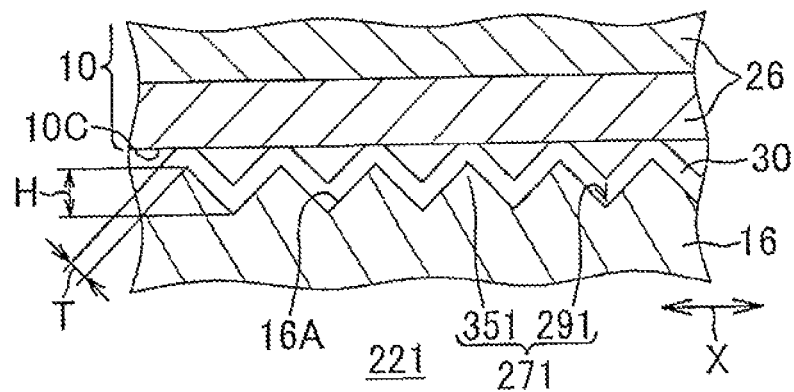
FIG. 7 is a view in which a first modification is applied to the bar component 221 shown in FIG. 6.

As a result of the foregoing, it is possible to prevent the carbon fiber in the pipe 10 from being cut, and achieve an improvement in the strengths in a coupling portion between the pipe 10 and the first metal component 171 and a coupling portion between the pipe 10 and the second metal component 181. Next, a first modification of the present embodiment will be described. FIG. 7 is a view in which the first modification is applied to the bar component 221 shown in FIG. 6. In FIG. 7, members similar to those described above are designated by the same reference numerals and description thereof will be omitted.

As shown in FIG. 7, a heat-adhesive film 30 is provided on the outer peripheral surface 16A of the metal annular ring 16 in the first modification so as to be along the rough portion 271. As an example, after the heat-adhesive film 30 is attached to the outer peripheral surface 16A subjected to surface roughening process, the metal annular ring 16 is fitted onto the mandrel 24, and the above-described core 231 is thereby prepared (see FIG. 2). Alternatively, the heat-adhesive film 30 may be attached to the outer peripheral surface 16A of the metal annular ring 16 having fitted onto the mandrel 24.

After the core 231 having the metal annular rings 16 to which the heat-adhesive films 30 are attached is prepared, the prepreg sheet 26 is wound around the outer peripheral surface 231A of the core 231, as described above (see FIG. 3). With this, the heat-adhesive film 30 is interposed between the prepreg sheet 26 and the outer peripheral surface 16A. That is, the step of winding the prepreg sheet 26 around the outer peripheral surface 231A of the core 231 includes the step of interposing the heat-adhesive film 30 between the prepreg sheet 26 and the outer peripheral surface 16A. By the step of winding the prepreg sheet 26 around the outer peripheral surface 231A of the core 231, the heat-adhesive film 30 is sandwiched between the outer peripheral surface 16A and the prepreg sheet 26 in the radial direction of the core 231 and is bonded to the outer peripheral surface 16A and the prepreg sheet 26. Next, by baking and curing the prepreg sheet 26, the heat-adhesive film 30 is bonded to the prepreg sheet 26 and the outer peripheral surface 16A more firmly. With this, it is possible to fix the metal annular ring 16 to the pipe 10 more firmly. Note that, in order to improve the strength of the fixation, a thickness T of the heat-adhesive film 30 is preferably a thickness that does not exceed a height H of the convex portion 351 in the rough portion 271 (the depth of the concave portion 291).

As the heat-adhesive film 30, heat-adhesive films including epoxy resin, acrylic resin, and polyester resin can be used. Among them, it is preferable to use the heat-adhesive film 30 including the epoxy resin. When the heat-adhesive film 30 including the epoxy resin is used, the adhesion strength with the prepreg sheet 26 including the epoxy resin is further increased, and heat resistance is also improved.

Various changes can be made to the first embodiment described above. For example, in the present embodiment, the step of providing the female threaded portion 19 that is screw-fastened to the male threaded portion 201 provided in each of the first metal component 171 and the second metal component 181 in the inner peripheral surface 16B of the metal annular ring 16 is performed after the mandrel 24 is pulled out from the pipe 10, but the step thereof may also be performed before the metal annular ring 16 is fitted onto the mandrel 24.

In addition, the bar component 22 of the above-described embodiment has the configuration in which the metal components (the first metal component 171 and the second metal component 181) are fastened to the both end portions (both of the first end portion 10A and the second end portion 10B) of the pipe 10, but the bar component 22 may also have a configuration in which the metal component is fastened to only one of the end portions. Further, the bar component 221 of the above-described embodiment is the rack bar 8, but the bar component 221 may also be formed as a bar component other than the rack bar 8 (e.g., various shafts, rods, and pipe components).

Figure 8:
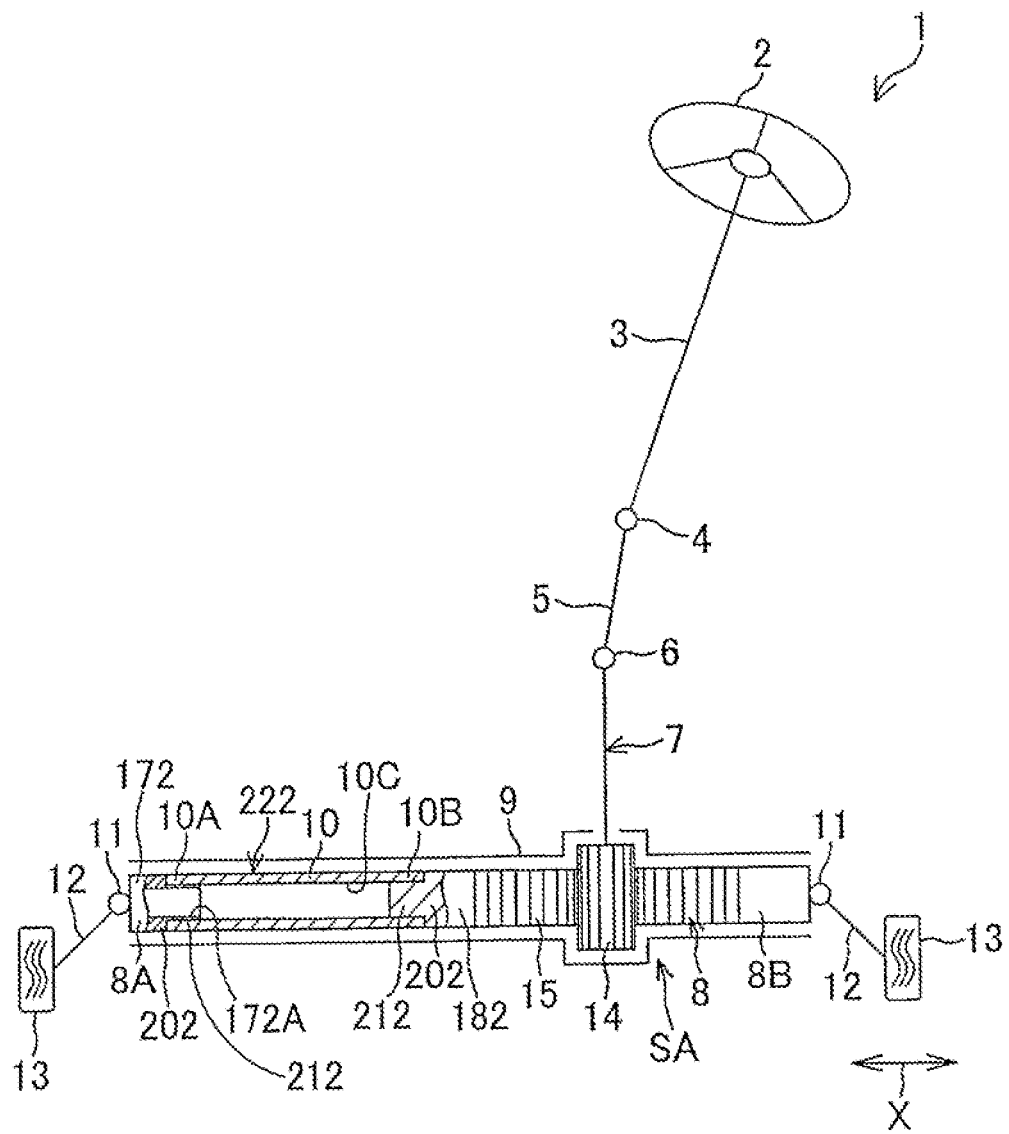
FIG. 8 is a schematic front view of a steering device 1 including a bar component 222 in a second embodiment of the invention.

Hereinbelow, a second embodiment of the invention will be described in detail with reference to the accompanying drawings. FIG. 8 is a schematic front view of the steering device 1 including a bar component 222 in the present embodiment. In the following description, members similar to those described in the first embodiment are designated by the same reference numerals, and description thereof will be omitted.

The rack bar 8 includes the pipe 10, and a first metal component 172 and a second metal component 182 as two metal components.

The first metal component 172 is adjacent to the joint 11 on the side of the first end portion 8A as the first end portion 8A of the rack bar 8. The first metal component 172 is coupled to the first end portion 10A of the pipe 10. The first metal component 172 integrally has a main body portion 202 and an extended portion 212 that are arranged in the axial direction X. The main body portion 202 has a cylindrical shape having a central axis extending in the axial direction X. The extended portion 212 is provided at a position in the first metal component 172 closer to the second end portion 8B of the rack bar 8 than the main body portion 202. The extended portion 212 is in a cylindrical shape that extends in the axial direction X from the main body portion 202 toward the second end portion 8B. The extended portion 212 is smaller in diameter than the main body portion 202 (thinner than the main body portion 202), and is disposed coaxially with the main body portion 202. An insertion hole 172A that extends in the axial direction X is formed in the first metal component 172. The insertion hole 172A passes through the central axes of the main body portion 202 and the extended portion 212 and extends through the main body portion 202 and the extended portion 212 in the axial direction X.

The second metal component 182 is adjacent to the joint 11 on the side of the second end portion 8B as the second end portion 8B of the rack bar 8. In order to prevent the abrasion of the rack teeth 15, the second metal component 182 is formed of e.g., a carbon steel such as S45C subjected to hardening or the like. Examples of the hardening include carburizing-quenching, induction hardening, and the like. The second metal component 182 is coupled to the second end portion 10B of the pipe 10. Similarly to the first metal component 172, the second metal component 182 integrally has the main body portion 202 and the extended portion 212 described above. However, the main body portion 202 and the extended portion 212 of the second metal component 182 may be different in dimensions (the diameter and the length in the axial direction X) from the main body portion 202 and the extended portion 212 of the first metal component 172.

The main body portion 202 of the second metal component 182 has a cylindrical shape having the central axis extending in the axial direction X. The rack teeth 15 are provided in the main body portion 202. The extended portion 212 of the second metal component 182 is provided at a position closer to the first end portion 8A of the rack bar 8 than the main body portion 202 in the second metal component 182. The extended portion 212 has a cylindrical shape that extends in the axial direction X from the main body portion 202 toward the first end portion 8A. However, the second metal component 182 does not have the insertion hole equivalent to the insertion hole 172A of the first metal component 172, and is solid.

The extended portion 212 of the first metal component 172 is fitted in the hollow portion of the first end portion 10A of the pipe 10 by being inserted in the axial direction X (from the left side in FIG. 1). The extended portion 212 of the second metal component 182 is fitted in the hollow portion of the second end portion 10B of the pipe 10 by being inserted in the axial direction X (from the right side in FIG. 1). With this, each of the first metal component 172 and the second metal component 182 is coupled to the end portion (the first end portion 10A or the second end portion 10B) of the pipe 10 in the axial direction X at the extended portion 212.

The pipe 10, the first metal component 172, and the second metal component 182 that are coupled to one another in this manner are integrated, and constitute the bar component 222 that extends in the axial direction X. The bar component 222 constitutes the rack bar 8. Since a part of the rack bar 8 is constituted by the pipe 10 made of the carbon fiber reinforced resin, it is possible to achieve a significant reduction in weight as compared with the case where the entire rack bar 8 is made of metal.

Figure 9:
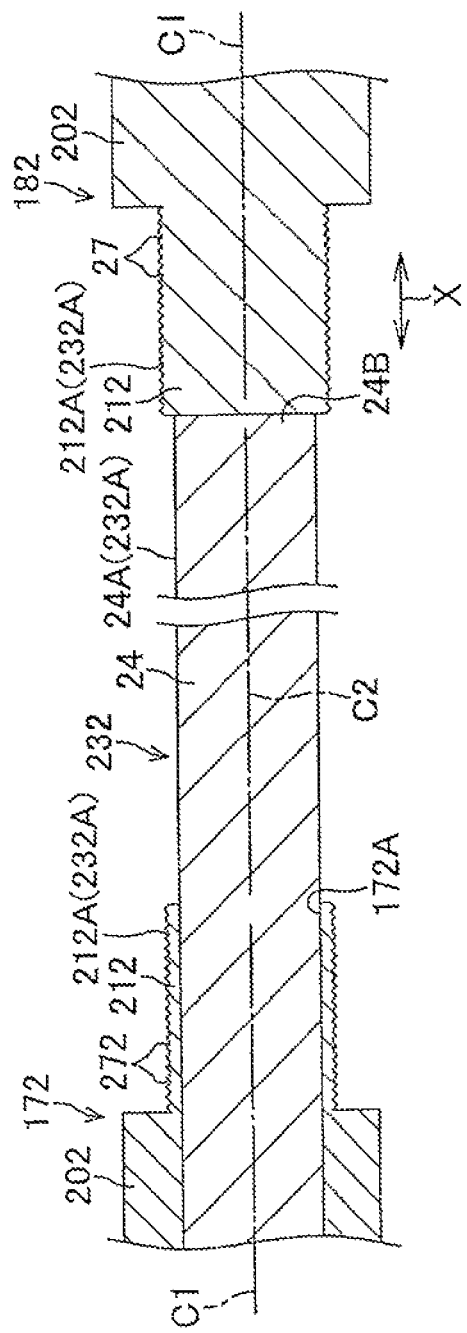
FIG. 9 is a schematic cross-sectional view showing a manufacturing step of the bar component 222.

Next, the manufacturing method of the bar component 222 will be described. FIG. 9 is a schematic cross-sectional view showing the manufacturing step of the bar component 222. The attitude of each member in FIG. 9 corresponds to that in FIG. 8 (the same applies to FIGS. 9 to 15 described later). As shown in FIG. 9, as the initial stage of manufacturing of the bar component 222, a core 232 is prepared. The core 232 is a member required to form the cylindrical pipe 10. The core 232 is constituted by connecting the mandrel 24 and the extended portions 212 of the first metal component 172 and the second metal component 182 to one another in the axial direction X.

The mandrel 24 is made of metal, and has a cylindrical shape that extends in the axial direction X. Outer peripheral surfaces 212A of the extended portions 212 of the first metal component 172 and the second metal component 182 are subjected to surface roughening process in advance. Accordingly, each outer peripheral surface 212A has a rough portion 272 provided with a large number of concave portions and convex portions. Examples of the surface roughening process include knurling such as diamond-patter knurling, key groove machining, splining, shot blasting, etching that uses acid, and laser etching, and diamond-pattern knurling is preferable in light of processing cost.

Since the second metal component 182 is subjected to the hardening described above, strength to bending stress is improved in the extended portion 212 of the second metal component 182, and toughness is improved in the portion of the outer peripheral surface 212A of the extended portion 212 subjected to the surface roughening process as compared with the toughness of the material that is not subjected to the hardening. Note that the first metal component 172 may also be subjected to the hardening. In FIG. 9, as the initial stage of the manufacturing step of the bar component 222, the core 232 is prepared by connecting the mandrel 24 and the extended portions 212 of the first metal component 172 and the second metal component 182 to one another in the axial direction X. Specifically, the first metal component 172 and the second metal component 182 are disposed so as to be spaced apart from each other in the axial direction X in a state in which the extended portions 212 of the first metal component 172 and the second metal component 182 oppose each other and, thereafter, the mandrel 24 is inserted into the insertion hole 172A of the first metal component 172. After the insertion, a part of the mandrel 24 remains in the insertion hole 172A, and the rest of the mandrel 24 is protruded from the insertion hole 172A and extended to the second metal component 182. In the mandrel 24, an end portion 24B on the side of the second metal component 182 abuts on the extended portion 212 of the second metal component 182 in the axial direction X (from the side of the first metal component 172). With this, the mandrel 24 is provided between the first metal component 172 and the second metal component 182, the first metal component 172, the second metal component 182, and the mandrel 24 are coaxially coupled to one another, and the core 232 is completed. Note that one of the second metal component 182 and the mandrel 24 may be provided with a convex portion, the other one of the second metal component 182 and the mandrel 24 may be provided with a concave portion, and the second metal component 182 and the mandrel 24 may be coaxially positioned by fitting the convex portion in the concave portion. Alternatively, a dedicated jig for positioning them may be used instead of the convex portion and the concave portion.

An outer peripheral surface 232A of the completed core 232 includes the outer peripheral surface 212A of each extended portion 212 and the outer peripheral surface 24A of the portion of the mandrel 24 that is protruded from the insertion hole 172A to the side of the second metal component 182. Since the first metal component 172, the second metal component 182, and the mandrel 24 are coaxially coupled to one another, a central axis C1 of each of the extended portions 212 of the first metal component 172 and the second metal component 182 and a central axis C2 of the mandrel 24 match each other and extend in the axial direction X.

Figure 10:
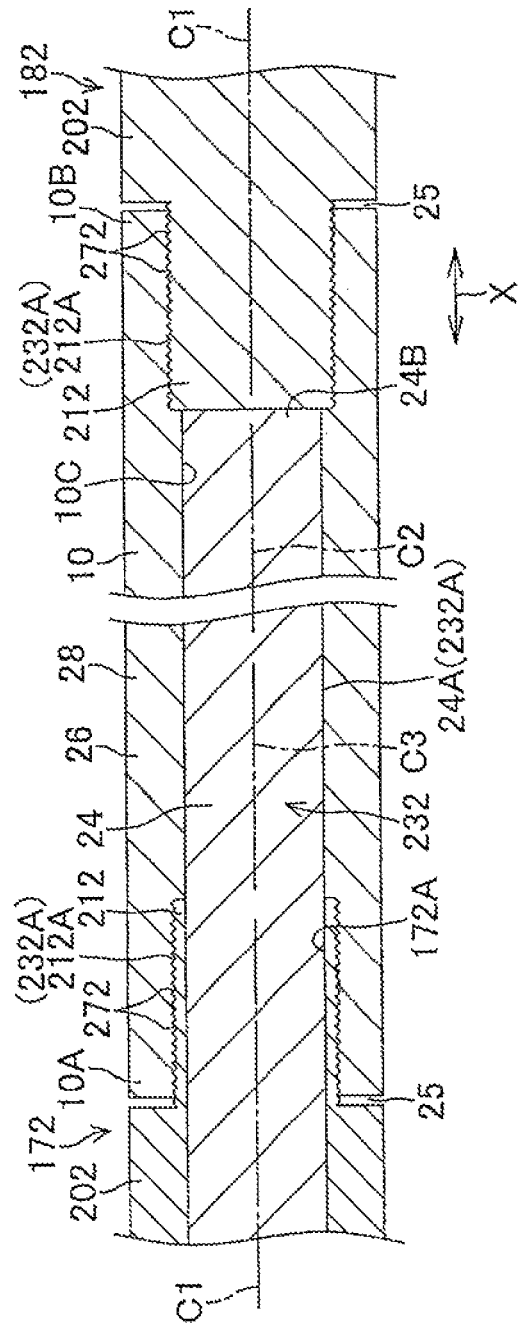
FIG. 10 is a schematic cross-sectional view showing the step subsequent to the step in FIG. 9.

FIG. 10 is a schematic cross-sectional view showing the step subsequent to the step in FIG. 9. In the step shown in FIG. 10, the prepreg sheet 26 is wound around the outer peripheral surface 232A of the core 232 once, or twice or more by, e.g., the sheet winding method. In the state after the winding, as shown in FIG. 10, the prepreg sheet 26 is placed on the mandrel 24 and each extended portion 212. In addition, the prepreg sheet 26 is in intimate contact with the outer peripheral surface 24A of the mandrel 24 and the outer peripheral surface 212A of each extended portion 212 and surrounds the core 232, and hence the entire prepreg sheet 26 has a substantially cylindrical shape.

Next, the prepreg sheet 26 wound around the outer peripheral surface 232A of the core 232 is baked and cured. By baking and curing in this step, the substantially cylindrical shape of the prepreg sheet 26 when the prepreg sheet 26 is wound around the outer peripheral surface 232A of the core 232 is hold as it is. Thereafter, the prepreg sheet 26 becomes the pipe 10 after cooling at room temperature. That is, the pipe 10 is formed by baking and curing the prepreg sheet 26 wound around the outer peripheral surface 232A. A part of the cured pipe 10 (the end portions 10A and 10B) is fitted onto (specifically, fitted onto and fixed to, as will be described later) the outer peripheral surface 212A of each extended portion 212.

A central axis C3 of the pipe 10 matches the central axis C1 of each extended portion 212 and the central axis C2 of the mandrel 24, and the pipe 10 is disposed coaxially with each extended portion 212 and the mandrel 24. Note that the prepreg sheet 26 is wound around the outer peripheral surface 232A of the core 232 by mainly using the winding method in which the direction of extension of the carbon fiber matches the axial direction X (what is called helical winding). Accordingly, in the pipe 10, the internal carbon fibers are aligned in the axial direction X, and hence the strength in the axial direction X is high.

Figure 11:
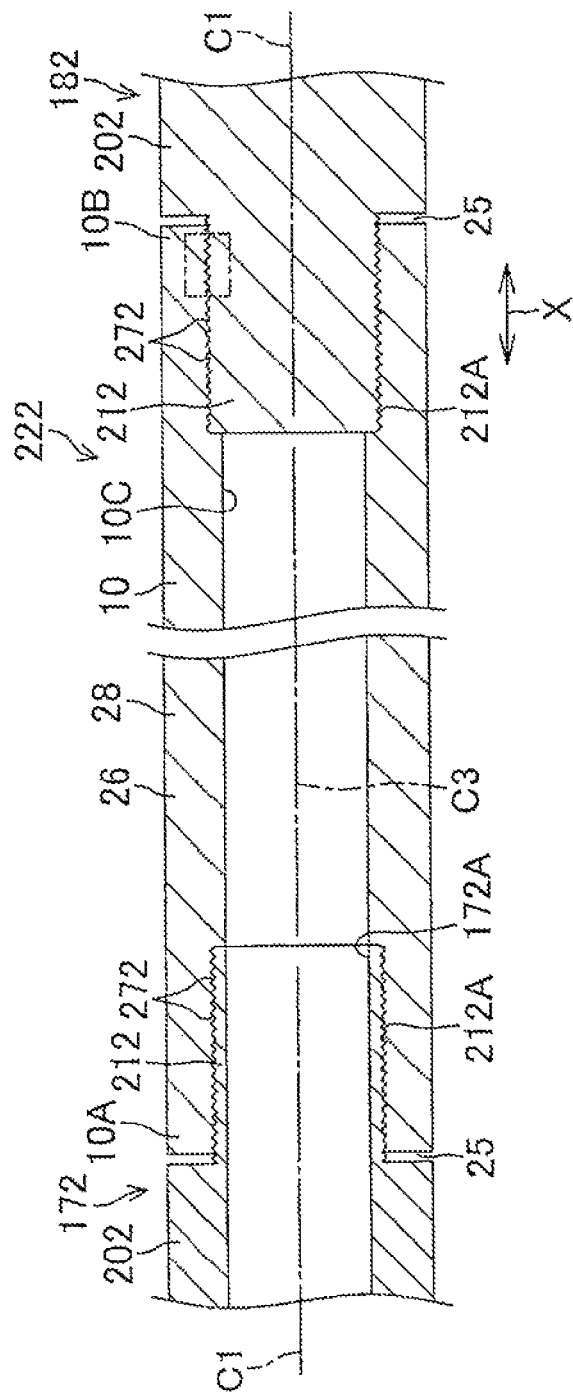
FIG. 11 is a schematic cross-sectional view showing the step subsequent to the step in FIG. 10.

FIG. 11 is a schematic cross-sectional view showing the step subsequent to the step in FIG. 10. As shown in FIG. 11, only the mandrel 24 of the core 232 is removed from the pipe 10 next. Specifically, the entire mandrel 24 is pulled out from the insertion hole 172A of the first metal component 172. At this point, in order to smoothly pull out the mandrel 24, the mandrel 24 may be shrunk by cooling. In this case, force required to pull out the mandrel 24 from the pipe 10 is reduced.

In the state in which the mandrel 24 is removed, it is preferable to form gaps 25 between the main body portions 202 and the first end portion 10A and the second end portion 10B of the pipe (e.g., a gap of about 1 mm to 2 mm at the end portion in the axial direction X). In order to form the gaps, in the step of winding the prepreg sheet 26 around the outer peripheral surface 232A of the core 232, it is only necessary to wind the prepreg sheet 26 so as to form the gaps 25 between the end portions 10A and 10B and the main body portions 202.

When the gap 25 is provided, in the case where bending stress is applied to the pipe 10, it is possible to prevent the end portions 10A and 10B from coming into contact with the main body portions 202, and improve the breaking strength of the pipe 10 to the bending stress. With the foregoing, the pipe 10 is coupled to the first metal component 172 and the second metal component 182 at the end portions 10A and 10B in the axial direction X, and the bar component 222 is completed.

Figure 12:
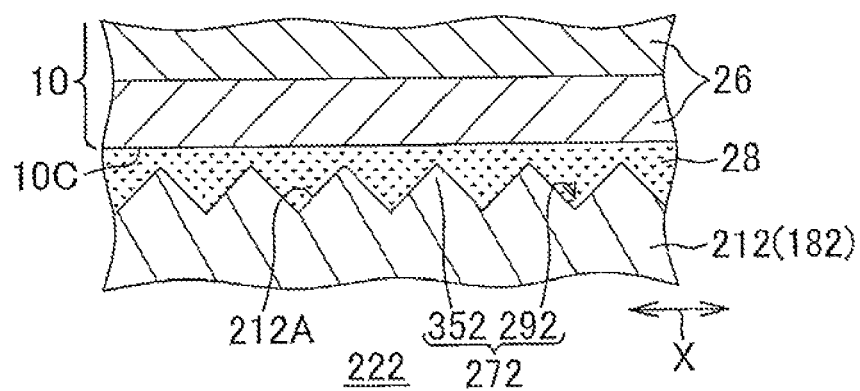
FIG. 12 is an enlarged view of a portion surrounded by a two-dot chain line in FIG. 11.

The completed bar component 222 maintains the state in which the central axis C1 of each extended portion 212 and the central axis C3 of the pipe 10 match each other and the state in which each extended portion 212 is disposed coaxially with the pipe 10. FIG. 12 is an enlarged view of a portion surrounded by a two-dot chain line in FIG. 11. As shown in FIG. 12, in the completed bar component 222, the resin 28 having exuded from the prepreg sheet 26 is present between the inner peripheral surface 10C of the pipe 10 and the outer peripheral surface 212A of each extended portion 212. In the step of winding the prepreg sheet 26 around the core 232 described above and the subsequent step of baking and curing (see FIG. 10), the resin 28 enters into each concave portion 292 in the rough portion 272 formed on the outer peripheral surface 212A of each extended portion 212 and is cured. In the state in which the resin 28 enters into the concave portion 292 and is cured, a convex portion 352 of the rough portion 272 is in intimate contact with the inner peripheral surface 10C of the pipe 10 so as to bite into the inner peripheral surface 10C, but is not in contact with the carbon fiber in the prepreg sheet 26. Therefore, the end portions 10A and 10B of the pipe 10 are fitted onto and fixed to (attached to) the outer peripheral surfaces 212A of the corresponding extended portions 212 in the state in which the internal carbon fibers are not cut (see FIG. 11). Note that the individual extended portions 212 in this state are positioned so as not to be displaced in the axial direction X or the circumferential direction relative to the end portions 10A and 10B of the pipe 10 (see FIG. 12).

Herein, a comparative example in which, unlike the present embodiment, the extended portion 212 subjected to the surface roughening process is not used is assumed. In the case of the comparative example, in order to screw-fasten the pipe 10 to the first metal component 172 and the second metal component 182, it is necessary to provide the threaded portions in the inner peripheral surface 10C of the pipe 10. In the case where the prepreg sheet 26 is wound around the core 232 by the helical winding in the comparative example, when the threaded portions are provided in the inner peripheral surface 10C of the pipe 10, the carbon fiber in the prepreg sheet 26 in the innermost layer (the layer closest to the core 232) may be cut. When the carbon fiber is cut, the strength of the pipe 10 may be reduced. In order to prevent the carbon fiber from being cut in the comparative example, it is necessary to wind the prepreg sheet 26 in at least the innermost layer around the core 232 by a winding method in which the carbon fiber extends in the circumferential direction of the core 232 (so-called hoop winding).

On the other hand, in the case of the present embodiment, it is not necessary to provide the threaded portions in the inner peripheral surface 10C of the pipe 10, and the pipe 10 can be formed only by the helical winding (or with an increased rate of use of the helical winding). That is, as compared with the comparative example, since the pipe 10 can be formed by using one winding method in the present embodiment, it is possible to reduce the number of turns of the prepreg sheet 26 around the core 232 (see FIG. 10), and increase the strength in the axial direction X. That is, by performing the surface roughening process on the extended portion 212, it is possible to achieve a reduction in the weight of the pipe 10 and an improvement in the strength of the pipe 10. In addition, the pipe 10 is directly coupled to the first metal component 172 and the second metal component 182 without interposing another component between the pipe 10 and each of the first metal component 172 and the second metal component 182. As a result, it is possible to maintain the state in which the pipe 10 and the first and second metal components 172 and 182 are coaxially disposed, and improve positioning accuracy of the pipe 10 and the first and second metal components 172 and 182. Further, it is possible to omit the other component and it becomes unnecessary to take countermeasures for preventing the carbon fiber from being cut in the case where the other component is provided, and hence it is possible to reduce the manufacturing cost of the entire bar component 222.

In addition, as described in the first embodiment, in the case where another metal component (metal annular ring) is interposed between the pipe 10 and each of the first metal component 172 and the second metal component 182, it is necessary to perform the hardening and the surface roughening process on the metal component for improving bending resistance. On the other hand, according to the present embodiment, it becomes unnecessary to perform the hardening or the surface roughening process, and hence it is possible to reduce the manufacturing cost as compared with the first embodiment. Further, since it becomes unnecessary to screw-fasten the metal component to each of the first metal component 172 and the second metal component 182, it is possible to save time and effort for threading and screw-fastening, and coaxially dispose the first and second metal components 172 and 182 and the pipe 10 with high accuracy as compared with the configuration of the first embodiment.

Furthermore, since the bar component 222 is formed without press-fitting the first metal component 172 and the second metal component 182 into the pipe 10, extra force is hardly applied to the portion between the completed pipe 10 and each of the first metal component 172 and the second metal component 182. As a result, it is possible to maintain the state in which the central axis C3 of the pipe 10 and the central axis C1 of each of the first metal component 172 and the second metal component 182 match each other. That is, it is possible to maintain the state in which the pipe 10 and the first and second metal components 172 and 182 are coaxially disposed, and improve the positioning accuracy of the pipe 10 and the first and second metal components 172 and 182.

Figure 13:
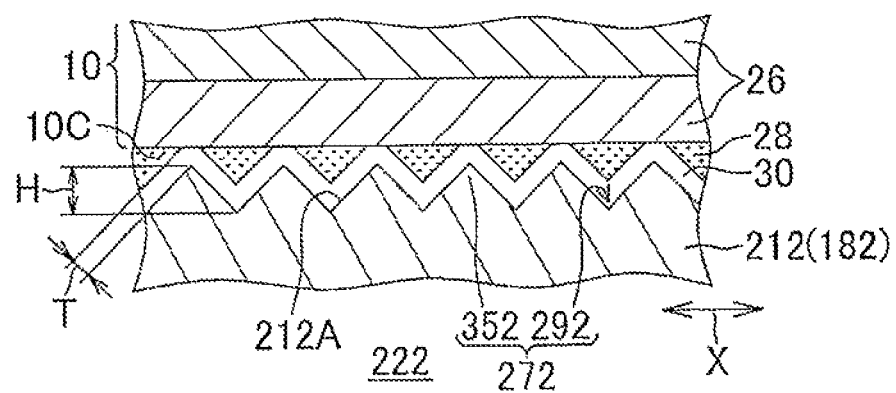
FIG. 13 is a view in which a second modification is applied to the bar component 222 shown in FIG. 12.

As a result of the foregoing, it is possible to achieve a reduction in manufacturing cost while improving the positioning accuracy of the pipe 10 and the first and second metal components 172 and 182. Next, a second modification of the present embodiment will be described. FIG. 13 is a view in which the second modification is applied to the bar component 222 shown in FIG. 12. In FIG. 13, members similar to those described above are designated by the same reference numerals, and description thereof will be omitted (the same applies to FIGS. 14 and 15 described later).

Similarly to the first modification of the first embodiment shown in FIG. 7, as shown in FIG. 13, the heat-adhesive film 30 is provided on the outer peripheral surface 212A of the extended portion 212 in the second modification so as to be along the rough portion 272. After the core 232 having the extended portion 212 to which the heat-adhesive film 30 is attached is prepared, as described above, the prepreg sheet 26 is wound around the outer peripheral surface 232A of the core 232 (see FIG. 10). With this, the heat-adhesive film 30 is interposed between the prepreg sheet 26 and the outer peripheral surface 212A. That is, in the second modification, the step of winding the prepreg sheet 26 around the outer peripheral surface 232A of the core 232 includes the step of interposing the heat-adhesive film 30 between the prepreg sheet 26 and the outer peripheral surface 212A. By the step of winding the prepreg sheet 26 around the outer peripheral surface 232A of the core 232, the heat-adhesive film 30 is sandwiched between the outer peripheral surface 212A and the prepreg sheet 26 in the radial direction of the core 232, and is bonded to the outer peripheral surface 212A and the prepreg sheet 26. Next, by baking and curing the prepreg sheet 26, the heat-adhesive film 30 is bonded to the prepreg sheet 26 and the outer peripheral surface 212A more firmly. With this, it is possible to fix the extended portion 212 to the pipe 10 more firmly. In order to improve the strength, the thickness T of the heat-adhesive film 30 is preferably a thickness that does not exceed the height H of the convex portion 352 in the rough portion 272 (the depth of the concave portion 292). In addition, the heat-adhesive film 30 can deliver the function of reducing stress occurring between the pipe 10 and each of the first metal component 172 and the second metal component 182.

FIG. 14 is a cross-sectional view of a portion where the second metal component 182 and the pipe 10 of a third modification are coupled to each other. As shown in FIG. 14, the extended portion 212 (the outer peripheral surface 212A)

of the third modification has a tapered shape in which the diameter is increased with distance from the main body portion 202 in the axial direction X. The prepreg sheet 26 is baked and cured in the state in which the prepreg sheet 26 is wound along the extended portion 212, and hence the inner peripheral surface 10C of the pipe 10 also has a tapered shape in which the diameter is increased with distance from the main body portion 202 in the axial direction X. With this configuration, in the case where force is applied to the pipe 10 in the axial direction X (toward the outside in the axial direction X), the tapered outer peripheral surface 212A of the extended portion 212 of the second metal component 182 is caught in the inner peripheral surface 10C of the pipe 10 in the axial direction X (from the inside in the axial direction X). Accordingly, the pipe 10 becomes less likely to be pulled out from the extended portion 212 so that the pipe 10 and the second metal component 182 become less likely to be separated from each other, and hence it is possible to achieve an improvement in the strength of the bar component 222. Note that, although only an area around the second metal component 182 is depicted in FIG. 14, the extended portion 212 (the outer peripheral surface 212A) of the first metal component 172 may also have the tapered shape similarly to the extended portion 212 of the second metal component 182. With this arrangement, it is possible to prevent the pipe 10 from being pulled out from both of the first metal component 172 and the second metal component 182.

FIG. 15 is a view in which a fourth modification is applied to the bar component 222 shown in FIG. 14. As shown in FIG. 15, the extended portion 212 of the fourth modification includes a protruded portion 31 that is protruded from the outer peripheral surface 212A in the radial direction and positions the pipe 10 in the axial direction X. The protruded portion 31 of the fourth modification is formed over the entire circumference of the outer peripheral surface 212A in the circumferential direction at the end portion of the extended portion 212 opposite to the main body portion 202 in the axial direction X. The second end portion 10B of the pipe 10 is fitted onto the extended portion 212 (the outer peripheral surface 212A) including the protruded portion 31. Accordingly, the protruded portion 31 bites into the inner peripheral surface 100C of the pipe 10 but not cutting the carbon fiber, and positions the pipe 10 in the axial direction X. With this configuration, in the case where force is applied to the pipe 10 in the axial direction X (toward the outside in the axial direction X), the protruded portion 31 of the second metal component 182 is caught in the inner peripheral surface 10C of the pipe 10. Accordingly, the pipe 10 becomes less likely to be pulled out from the extended portion 212 so that the pipe 10 and the second metal component 182 become less likely to be separated from each other, and hence it is possible to achieve an improvement in the strength of the bar component 222. Note that, although only an area around the second metal component 182 is depicted in FI 15, the extended portion 212 of the first metal component 172 may also include the protruded portion 31 similarly to the extended portion 212 of the second metal component 182. With this arrangement, it is possible to prevent the pipe 10 from being pulled out from both of the first metal component 172 and the second metal component 182.

Various changes can also be made to the second embodiment described above. For example, in light of the strength of the second metal component 182 formed with the rack teeth 15, as in the above-described embodiment, it is preferable to provide the insertion hole 172A in the first metal component 172. However, in the case where it is not necessary to consider the strength of the second metal component 182, instead of the insertion hole 172A of the first metal component 172, an insertion hole equivalent to the insertion hole 172A may be provided in the second metal component 182. In this case, the mandrel 24 is inserted into the insertion hole of the second metal component 182.

In addition, the heat-adhesive film 30 of the second modification can be applied to the bar components 222 of the third modification and the fourth modification. Further, the tapered extended portion 212 of the third modification may be provided in only one of the first metal component 172 and the second metal component 182. Furthermore, the protruded portion 31 of the fourth modification may not be formed over the entire circumference of the outer peripheral surface 212A in the circumferential direction. Moreover, the protruded portion 31 may be provided in a portion other than the end portion of the outer peripheral surface 212A of the extended portion 212 in the axial direction X. Additionally, the protruded portion 31 may also be provided in only one of the first metal component 172 and the second metal component 182.

In addition, the bar component 222 in the above-described embodiments is the rack bar 8, but the bar component 222 may also be formed as a bar component other than the rack bar 8 (e.g., various shafts, rods, and pipe-shaped components).

What is claimed is:

1. A manufacturing method of a bar component including a pipe made of a carbon fiber reinforced resin and an internal metal member having an outer peripheral surface in contact with an inner peripheral surface of an end portion of the pipe in an axial direction, the method comprising:
   preparing a core including a metal mandrel extending in the axial direction and the internal metal member having the outer peripheral surface subjected to surface roughening process;
   winding a prepreg sheet obtained by impregnating carbon fibers with resin around an outer peripheral surface of the core;
   forming the pipe having the end portion fitted onto and fixed to the outer peripheral surface of the internal metal member by baking and curing the prepreg sheet wound around the outer peripheral surface of the core; and
   removing the mandrel from the pipe,
   wherein the prepreg sheet is wound around the outer peripheral surface of the core with a heat-adhesive film interposed between the prepreg sheet and an outer peripheral surface of the internal metal member.

2. The manufacturing method of a bar component according to claim 1, wherein:
   the internal metal member is a metal annular ring; and
   the core is prepared by fitting the metal annular ring onto the mandrel.

3. The manufacturing method of a bar component according to claim 2, further comprising
   screw-fastening a metal component to an inner peripheral surface of the metal annular ring to fasten the metal component to the end portion of the pipe.

4. The manufacturing method of a bar component according to claim 3, further comprising
   forming, in the inner peripheral surface of the metal annular ring, a female threaded portion to be screw-fastened to a male threaded portion provided in the metal component.

5. The manufacturing method of a bar component according to claim 1, wherein:
the bar component includes the pipe, and a metal component having a main body portion and an extended portion smaller in diameter than the main body portion, the main body portion and the extended portion being arranged in the axial direction of the pipe;
the internal metal member is the extended portion; and
the core is prepared by connecting the mandrel and the extended portion to each other in the axial direction.

6. The manufacturing method of a bar component according to claim 5, wherein the extended portion has a tapered shape in which a diameter is increased with distance from the main body portion in the axial direction.

7. The manufacturing method of a bar component according to claim 5, wherein the extended portion includes a protruded portion that is protruded from an outer peripheral surface of the extended, portion, and positions the pipe in the axial direction.

8. A bar component manufactured by the manufacturing method according to claim 1.

9. A bar component manufactured by the manufacturing method according to claim 2.

10. The bar component according to claim 9, wherein a part of the metal annular ring is protruded from the pipe to an outside in the axial direction.

11. The bar component according to claim 10, wherein the bar component constitutes a rack bar included in a rack and pinion type steering device.

12. A bar component manufactured by the manufacturing method according to claim 5.

13. The bar component according to claim 12, wherein the bar component constitutes a rack bar included m a rack and pinion type steering device.

* * * * *